United States Patent
Nagamatsu et al.

[11] Patent Number: 5,959,472
[45] Date of Patent: Sep. 28, 1999

[54] DRIVER CIRCUIT DEVICE

[75] Inventors: Tetsu Nagamatsu, Kawasaki; Tadahiro Kuroda, Yokohama, both of Japan

[73] Assignee: Kabushiki Kaisha Toshiba, Tokyo, Japan

[21] Appl. No.: 08/791,047

[22] Filed: Jan. 28, 1997

[30] Foreign Application Priority Data

Jan. 31, 1996 [JP] Japan .................................... 8-015949

[51] Int. Cl.$^6$ .................................................. H03F 3/45
[52] U.S. Cl. ......................... 327/108; 327/384; 326/27; 326/83
[58] Field of Search .................................. 327/108, 384, 327/387, 391, 562, 563; 326/26, 27, 30, 82, 83, 86

[56] References Cited

U.S. PATENT DOCUMENTS

| | | | |
|---|---|---|---|
| 5,179,358 | 1/1993 | Martin | 331/1 A |
| 5,519,728 | 5/1996 | Kuo | 375/257 |
| 5,684,429 | 11/1997 | Sanwo et al. | 327/563 |
| 5,694,060 | 12/1997 | Brunt et al. | 326/86 |

FOREIGN PATENT DOCUMENTS

| | | |
|---|---|---|
| 539230 | 4/1993 | European Pat. Off. . |
| 544362 | 6/1993 | European Pat. Off. . |

OTHER PUBLICATIONS

"Driver and Receiver Models", Different Signals for SCI, IEEE, Nov. 27, 1995, pp. 33–34.

"A–1 Driver and Receiver Models" SCI–LVDS: Section A–DO.5, IEEE, Sep. 9, 1993, pp. 33–34.

Yasuo Unekawa, et al., "A 5Gb/S 8×8 ATM Switch Element CMOS LSI Supporting Five Quality-of-Service Classes with 2000MHz LVDS Interface", 1996 IEEE International Solid-State Circuits Conference, pp. 118–119.

Primary Examiner—Tuan T. Lam
Attorney, Agent, or Firm—Loeb & Loeb LLP

[57] ABSTRACT

In the constant current drive type driver used for an LVDS (low voltage differential signal) interface, the parasitic capacitance of the package pins is charged and discharged sufficiently at a high speed to secure the high speed signal transmission operation. Further, the AC differential amplitude large enough to be received by the receiver can be obtained. The driver circuit device comprises: a transmit circuit composed of transistors (52, 53, 56, 57) for transmitting a signal by switching the signal current direction flowing through a pair of transmission lines (8, 9) connected between two output terminals (13 and 13B); and a constant current source composed of transistors (54, 75) for controlling the current value of the transmit circuit. In the idle state, only one of the two transistors (54 and 75) of the constant current source is turned on to limit the signal current flowing through the output terminals (13 and 13B). On the other hand, in the high speed signal transmission, both the transistors (54, 75) are turned on to increase the signal current flowing through the output terminals (13, 13B) to obtain a signal current of high DC LVDS level.

17 Claims, 7 Drawing Sheets

DRIVER CIRCUIT DEVICE

BACKGROUND OF THE INVENTION

1. Field of the Invention

The present invention relates to a driver circuit device, and more specifically to circuit construction of a driver circuit device used for a high-speed small-amplitude interface which can transmit signals at high speed.

2. Description of the Prior Art

Recently, an LVDS (low voltage differential signal) interface has been identified as an interface for transmitting small amplitude signals at high speed. This LVDS interface is standardized as differential small-amplitude interfaces by P1596. 3 which is one of the small standardization committees of IEEE. This standard is explained in detail in Document [IEEE Draft Standard for Low-voltage Scalable Coherent Interface (SCI) Draft 1. 20] (Jul. 13, 1995).

Figure 5:
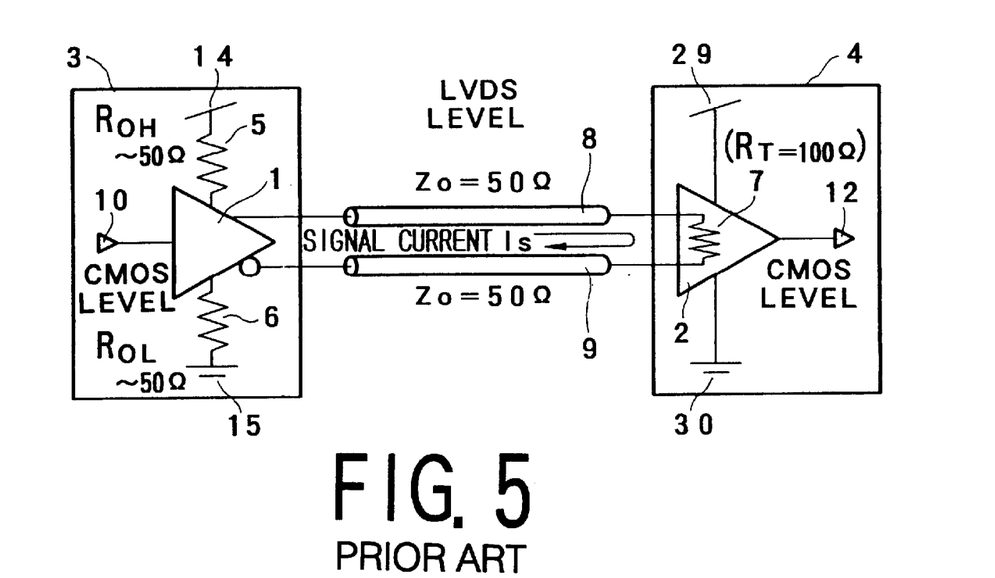
FIG. 5 is a conceptual circuit diagram showing the LVDS interface.

FIG. 5 is a conceptual view for assistance in explaining this LVDS interface.

In the drawing, a driver block 3 and a receiver block are connected by a going transmission line 8 and a returning transmission line 9. The going and returning transmission lines 8 and 9 constitute a so-called equilibrium transmission line having the same electrical characteristics. Further, the major feature of this LVDS interface is to transmit one signal through these two transmission lines.

The driver block 3 has a driver chip 1 for inputting a signal from an input terminal 10. A high voltage supply 14 is connected to the driver chip 1 via a high voltage drive resistor 5, and a low voltage supply 15 is connected to the same driver chip 1 via a low voltage drive resistor 6. Here, the resistance value $R_{OH}$ of the high voltage drive resistor 5 is about 50Ω and the resistance value $R_{OL}$ of the low voltage drive resistor 6 is about 50Ω.

The receiver block 4 has a receiver chip 2 for outputting a signal from an output terminal 12. A high voltage supply 29 is connected to the receiver chip 2, and a low voltage supply 30 is connected to the same receiver chip 2. Here, the resistance value $R_T$ of an end resistor 7 is about 100Ω. Further, the impedance of each of the going and returning transmission lines 8 and 9 is 50Ω.

In the construction as described above, the driver chip 1 forms a differential signal on the basis of an input signal applied to the input terminal 10 in such a way that a potential difference can be generated between the going and returning transmission lines 8 and 9. On the other hand, the receiver chip 2 converts the differential signal generated between the going and returning transmission lines 8 and 9 into a CMOS level and outputs the converted CMOS level signal from the output terminal 12.

The principle of the LVDS is to direct a signal current $I_s$ generated on the driver chip (1) side to flow through a loop formed by the equilibrium transmission line (i.e., both the going and returning transmission lines 8 and 9) and the end resistor 7 on the receiver chip (2) side, to generate a signal voltage across the end resistor 7 for signal transmission. Here, the signals of "0" and "1" can be discriminated by switching the current direction of the signal current $I_s$.

In the circuit construction as described above, since the current flowing through the driver chip 1 is roughly constant and further since the signal currents $I_s$ flowing through the going and returning transmission lines 8 and 9 are the same with respect to each other in magnitude but opposite to each other in direction, the total current flowing through the equilibrium transmission line is "0", so that the signal current $I_s$ hardly fluctuates.

On the other hand, when a current switchable-type comparator is used as the receiver chip 2, it is possible to consider that the current flowing the whole transmission system hardly fluctuates.

The above-mentioned characteristics of the driver circuit imply that the noise generated due to current fluctuations in the transmission system is small. In addition, since the interference between the transmission lines between two adjacent ports and/or the simultaneous switching interference between two LSIs, this LVDS interface is suitable for use to transmit high speed signals higher than 200 MHz.

In this connection, in the LVDS interface, the signal current $I_s$ is about 3 mA, and the voltage across the end resistor 7 is about 300 mV.

Figure 6:
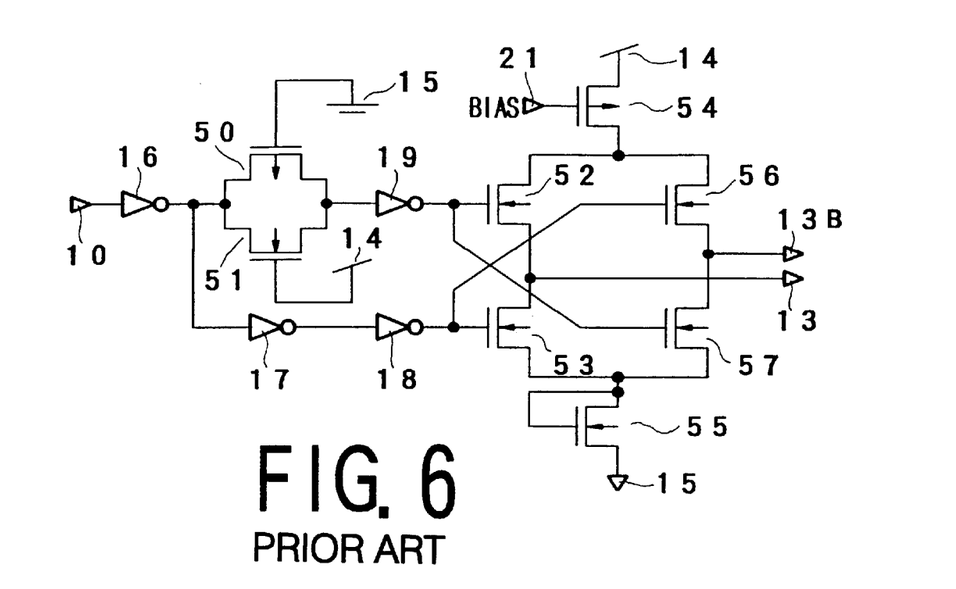
FIG. 6 is a circuit diagram showing a driver circuit of a prior art driver circuit device.

In the circuit construction as shown in FIG. 5, the driver block 3 can be realized by a circuit as shown in FIG. 6.

In FIG. 6, an input signal is applied from the input terminal 10 through an inverter 16. After having passed through a buffer circuit composed of two transistors 50 and 51, an output of the inverter 16 is further inverted by another inverter 19, and then inputted to two gates of two transistors 52 and 57. At the same time, the output of the inverter 16 is inputted to two gates of two transistors 53 and 56 via two other inverters 17 and 18 without inversion. Further, the buffer circuit composed of the two transistors 50 and 51 serves to compensate for a time delay of the signal inverted by the inverter 17 for transmitting the signal in parallel to the buffer circuit (50 and 51).

Two drains of the transistors 52 and 56 are connected to a drain of a transistor 54. A source of the transistor 54 is connected to the high voltage supply 14, and a gate of the transistor 54 is connected to a bias input terminal 21.

On the other hand, two sources of the transistors 53 and 57 are connected to a drain of a transistor 55. A gate of the transistor 55 is connected to its drain, and a source thereof is connected to the low voltage supply 15.

A source of the transistor 52 and a drain of the transistor 53 are connected in common to an output terminal 13. The output terminal 13 is connected to the going transmission line 8 shown in FIG. 5.

On the other hand, a source of the transistor 56 and a drain of the transistor 57 are connected in common to an output terminal 13B. The output terminal 13B is connected to the returning transmission line 9 shown in FIG. 5.

In the above-mentioned circuit construction, the transistor 54 to which a bias BIAS is applied through the bias input terminal 21 serves as the high voltage drive resistor 5 shown in FIG. 5, and the transistor 55 serves as the low voltage drive resistor 6 shown in FIG. 5.

Figure 7:
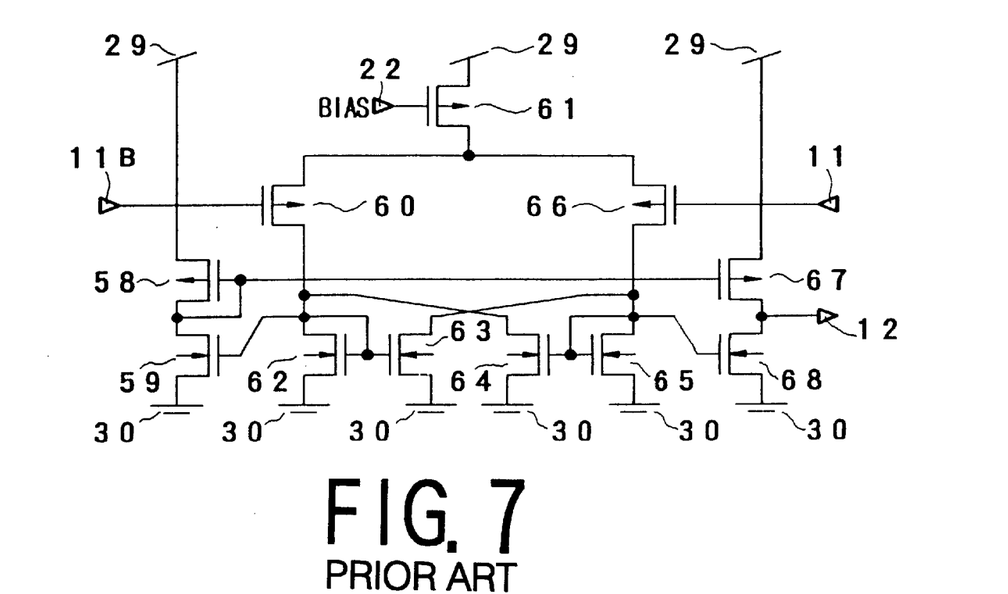
FIG. 7 is a circuit diagram showing a receiver circuit of the prior art driver circuit device.

On the other hand, the receiver block 4 shown in FIG. 5 can be realized by a circuit as shown in FIG. 7.

In FIG. 7, an input terminal 11 connected to the going transmission line 8 is connected to a gate of a transistor 60. On the other hand, an input terminal 11B connected to a returning transmission line 9 is connected to a gate of a transistor 60. Two sources of the transistors 60 and 66 are connected in common to a drain of a transistor 61. A gate of the transistor 61 is connected to a bias input terminal 22, and a source thereof is connected to a high voltage supply 29.

A drain of the transistor 60 is connected to a source and a gate of a transistor 62, a gate of a transistor 63, a drain of a transistor 64, and a gate of a transistor 59, respectively.

A drain of the transistor 66 is connected to a drain and a gate of a transistor 65, a gate of the transistor 64, a drain of a transistor 63, and a gate of a transistor 68, respectively.

Further, sources of the transistors 62, 63, 64, 65, 59 and 68 are all connected to the low voltage supply 30.

A drain of the transistor 59 is connected to a drain and a gate of the transistor 58, and a gate of the transistor 67. On the other hand, a source of the transistor 58 is connected to the high voltage supply 29.

Further, a source of the transistor 67 is connected to the high voltage supply 29, and a drain of the transistor 67 is connected to a drain of the transistor 68. Further, two drains of the transistors 67 and 68 are connected to an output terminal 12.

Figure 8:
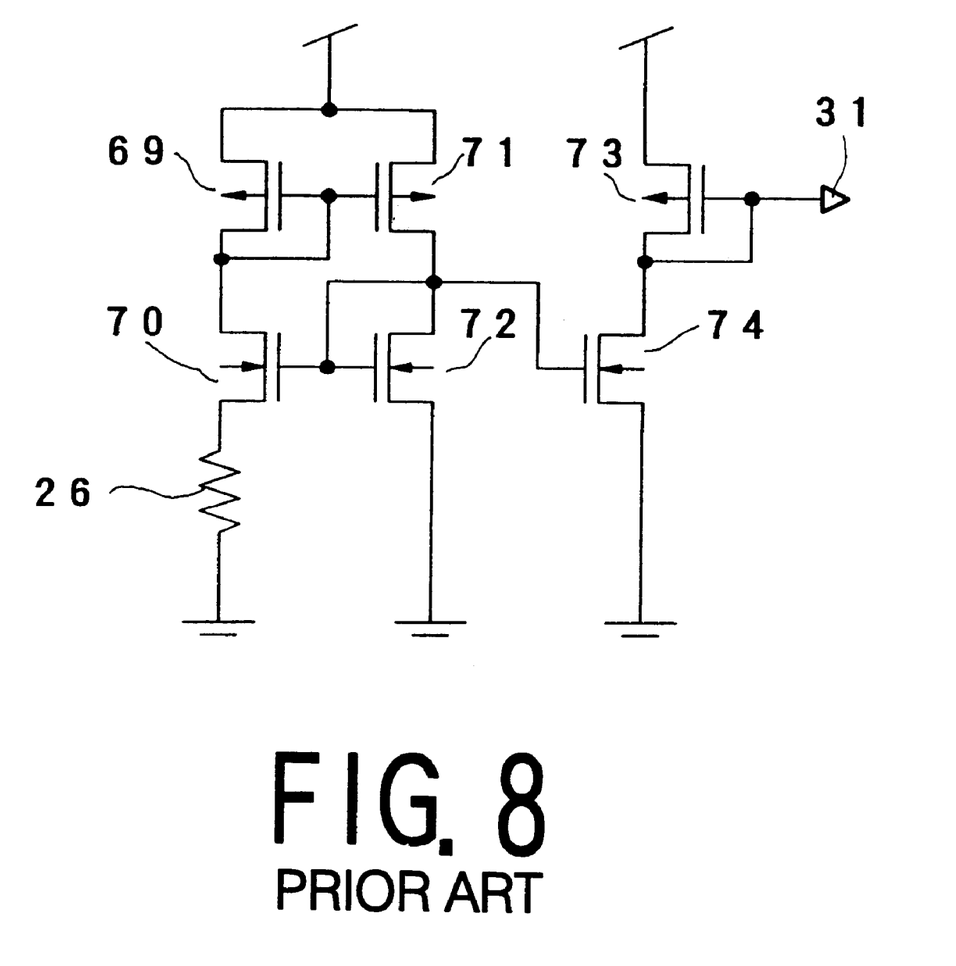
FIG. 8 is a circuit diagram showing a current bias circuit of the prior art driver circuit device.

Further, in the driver block 3 and the receiver block 4 shown in FIGS. 6 and 7, respectively, a current bias circuit for determining current is used, respectively. FIG. 8 shows an example of the current bias circuit.

In FIG. 8, a bias output terminal 31 is derived from a gate and a drain of a transistor 73, and a drain of a transistor 74. A source of the transistor 73 is connected to the high voltage supply, and a source of a transistor 74 is connected to the low voltage supply.

A gate of the transistor 74 is connected to a drain of a transistor 71 and a drain and a gate of a transistor 72. A source of the transistor 71 is connected to the high voltage supply, and a source of the transistor 72 is connected to the low voltage supply.

A gate of the transistor 71 is connected a gate and a drain of a transistor 69, and a gate of the transistor 72 is connected to a gate of a transistor 70. A source of the transistor 69 is connected to the high voltage supply, and a source of the transistor 70 is connected to the low supply voltage.

Further, an output signal of the bias output terminal 31 of the current bias circuit shown in FIG. 8 is used as the bias input applied to the bias input terminal 21 of the driver block shown in FIG. 6 and as the bias input applied to the bias input terminal 22 of the receiver block shown in FIG. 7.

In the circuit construction as described above, when a high speed signal higher than 400 MHz is transmitted, since a parasitic capacitance as small as 10 pF is inevitably formed by usually-used pins of a package, this causes a problem as follows: In order to drive such a parasitic capacitance as described above, a signal current as small as 3 to 4 mA is not sufficient. Further, when the signal frequency is high, it is impossible to obtain a signal having a sufficient amplitude between the low and high voltages, that is, between the low and high supply voltage levels. As a result, the signal of the present cycle is shifted to that of the succeeding cycle before the signal level swings full with an amplitude of about 300 mV prescribed by the LVDS interface.

In other words, on the receiver side, since the differential amplitude of the signal is reduced as compared with a predicted DC value, a special circuit for increasing the sensitivity is additionally required. As a result, another problem arises inevitably such that a chip area increases to construct the additional circuit and further the current consumption increases.

Further, in a back plane transmission environment or a cable transmission environment as prescribed by the LVDS, if the differential amplitude drops less than 200 mV, there exists such a possibility that the differential signal is inevitably subjected to the influence of external noise. That is, in order to transmit a high speed signal higher than 400 MHz, it is necessary to take appropriate measures for realizing the high speed operation and for securing the sufficient AC differential amplitude, by charging and discharging the package parasitic capacitance at a sufficiently high speed.

SUMMARY OF THE INVENTION

With these problems in mind, therefore, it is the object of the present invention to provide a driver circuit device of constant current type used for an LVDS interface, which can secure the high speed transmission operation by charging and discharging a parasitic capacitance at high speed so as to obtain an AC differential amplitude wide enough to be received by the receiver.

To achieve the above-mentioned object, the present invention provides a driver circuit device for low voltage differential signals, comprising: an output circuit (52, 53; 56. 57) for outputting a first output potential from a first output terminal (13) and a second output potential from a second output terminal (13B), respectively according to an input signal applied to an input terminal (10), a differential signal being formed by the first and second output potentials according to the input signal; and a plurality of voltage supply circuits (76, 54; 77, 75; 76, 54A; 77, 75A) connected between a voltage supply terminal and said output circuit in parallel to each other, each for supplying an operating supply voltage to said output circuit; each of said voltage supply circuits having a switch (76, 77) for connecting or disconnecting the voltage supply terminal to or from said output circuit; the number of said turned-on switches being determined according to frequency of said input signal.

Further, it is preferable that each of said voltage supply circuits further comprises series-connected transistors (54; 75; 54A; 75A) each having a gate to which a bias voltage is applied.

Further, it is preferable that each of said transistors (54, 75) is a P-channel transistor.

Further, it is preferable that each of said transistors (54A, 75A) is an N-channel transistor.

Further, it is preferable that a current value applied from said voltage supply circuits to said output circuit is changed by changing the number of said turned-on switches (76, 77).

Further, it is preferable that a voltage value applied from said voltage supply circuits to said output circuit is changed by changing the number of said turned-on switches (76, 77).

Further, it is preferable that the device further comprises a bias circuit (FIGS. 2 and 3) for applying the bias to each of said transistors (54; 57).

Further, the present invention provides an interface for low voltage differential signals, comprising: a driver block (3) for outputting a first output potential from a first output terminal and a second output potential from a second output terminal, respectively according to an input signal applied to an input terminal (10), so as to form a differential signal between the first and second output potentials;

a transmission circuit having a going transmission line (8) connected to the first output terminal and a returning transmission line (9) connected to the second output terminal, both for transmitting current reciprocatingly according to the differential signal; and a receiver block (4) connected to the going and returning transmission lines (8, 9), for receiving a signal current (Is) corresponding to the input signal through the going transmission line (8), and transmitting an output signal corresponding to the signal current (Is) through the returning transmission line (9), and wherein said driver block (3) comprises:

an output circuit (52, 53; 56. 57) for outputting a first output potential from a first output terminal (13) and a second output potential from a second output terminal (13B), respectively according to an input signal applied to an input terminal (10), a differential signal being formed by the first and second output potentials according to the input signal; and a plurality of voltage supply circuits (76, 54; 77, 75; 76, 54A; 77, 75A) connected between a voltage supply terminal and said output circuit in parallel to each other, each for supplying an operating supply voltage to said output circuit; each of said voltage supply circuits having a switch (76, 77) for connecting or disconnecting the voltage supply terminal to or from said output circuit; the number of said turned-on switches being determined according to frequency of said input signal.

Further, it is preferable that wherein said going and returning transmission lines (8, 9) forms an equilibrium transmission line for transmitting a signal through the two transmission lines.

Further, it is preferable that said receiver block further comprises an end resistance (7) connected between the going and returning transmission lines (7, 9), for generating a potential difference obtained by passing a signal through said end resistance, the output signal being outputted by said receiver block on the basis of the generated potential difference.

In the driver circuit device according to the present invention, since the device comprises a transmit circuit for transmitting a signal by switching the current direction of the signal flowing through a pair of transmission lines; a constant current source for controlling the current value of the transmit circuit; and control means for controlling the current driving capability of the constant current source by changing the bias applied to the constant current source. Therefore, for instance, in the idle state, only one of the two transistors of the constant current source is turned on to limit the signal current flowing through the output terminals. On the other hand, in the high speed signal transmission, both the transistors are turned on to increase the signal current flowing through the output terminals to obtain a signal current of high DC LVDS level.

DETAILED DESCRIPTION OF THE PREFERRED EMBODIMENTS

Prior to the description of the embodiments of the present invention, the gist of the present invention will be described hereinbelow from the principle standpoint thereof.

The driver circuit device according to the present invention is of a constant current type used for an LVDS interface. Here, the driver circuit device is constructed in such a way that the driver signal current is increased to charge and discharge the parasitic capacitance formed in the package pins at sufficiently high speed; that is, in such a way that the differential amplitude of the AC signal level can be secured in conformity with the standard in the high speed operation by previously setting the differential amplitude to a large amplitude beyond the standard. On the other hand, when the signal does not change for many hours, an increase of current is suppressed by use of switching means provided in a current source for generating the signal current or a bias circuit.

Figure 4:
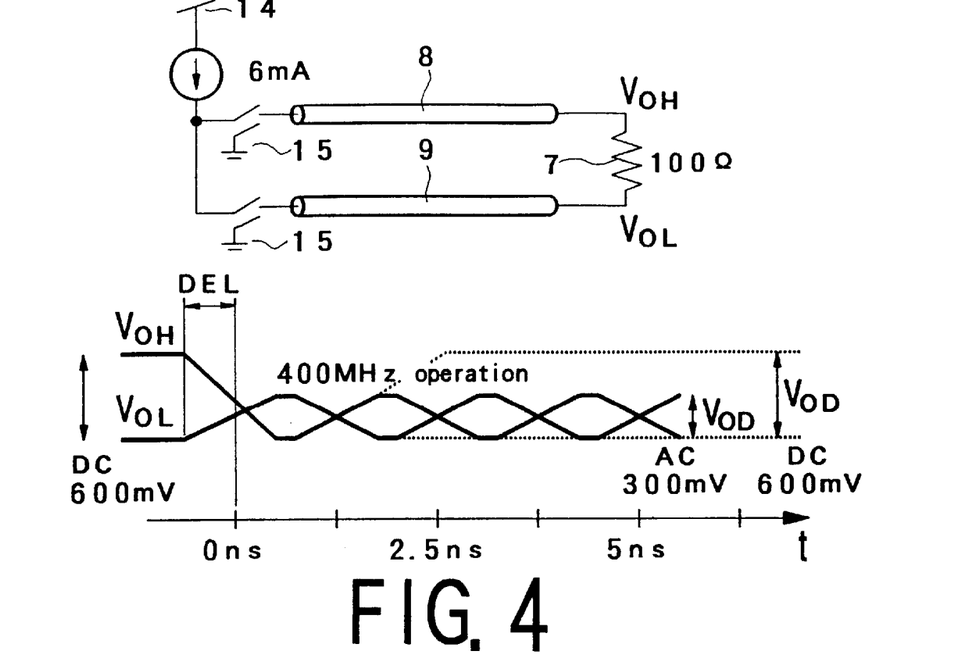
FIG. 4 is an illustration showing the state transition of a signal, for assistance in explaining the operation of the driver circuit device of the present invention.

In more detail, as shown in FIG. 4, in the high speed operation, a signal current of 6 mA (twice larger than 3 mA) is supplied. As a result, $V_{OL}$ level (i.e., DC low level of the driver) is a load element of the NMOS transistor, the level thereof does not fluctuate largely with increasing current. However, since $V_{OH}$ level (i.e., DC high level of the driver) or $V_{OD}$ of the DC differential amplitude of the driver increases to 600 mV (i.e., twice larger than 300 mV).

In the state transition shown in FIG. 4, when DC level is shifted to AC level, a slight delay DEL occurs between the two. However, it is possible to eliminate this problem without using the initial clock in the state transition.

Further, there exists the case where the transition time differs according to the signal retention time. Although this causes a problem in particular when NRZ (not-return-zero) data are transmitted, since the maximum frequency of the data of this type is half of the clock frequency, no problem arises.

In the waveforms as shown in FIG. 4, the maximum AC differential amplitude is about half of the DC amplitude, and further the waveforms of both are roughly a sine wave or triangular shape, respectively (not a trapezoidal shape). However, the waveforms are effective in high speed operation, because the comparator used for the receiver can receive these waveform signals without much increasing the sensitivity thereof.

Further, on the driver side, since the current of 3 mA is increased to 6 mA, a problem with respect to an increase of current consumption inevitably arises. In other words, DC current of 6 mA flows wastefully in an idle state where no clock signal is being transmitted. In the idle state, however, the minimum possible current required to hold the signal is necessary, and further this current is about half of the current required to transmit the high speed clock. In this case, although a method of cutting off the whole current can be considered, this method is not preferable, because of its delay in the reset operation or an unstable operation caused when a differential potential is not applied to the receiver side. Accordingly, in the present invention, the signal current is increased in order to hold the high speed driving capability in the clock transmission period but decreased in the idle state, by use of signal current switching means.

The embodiments of the driver circuit device according to the present invention will be described in further detail hereinbelow with reference to the attached drawings.

Figure 1:
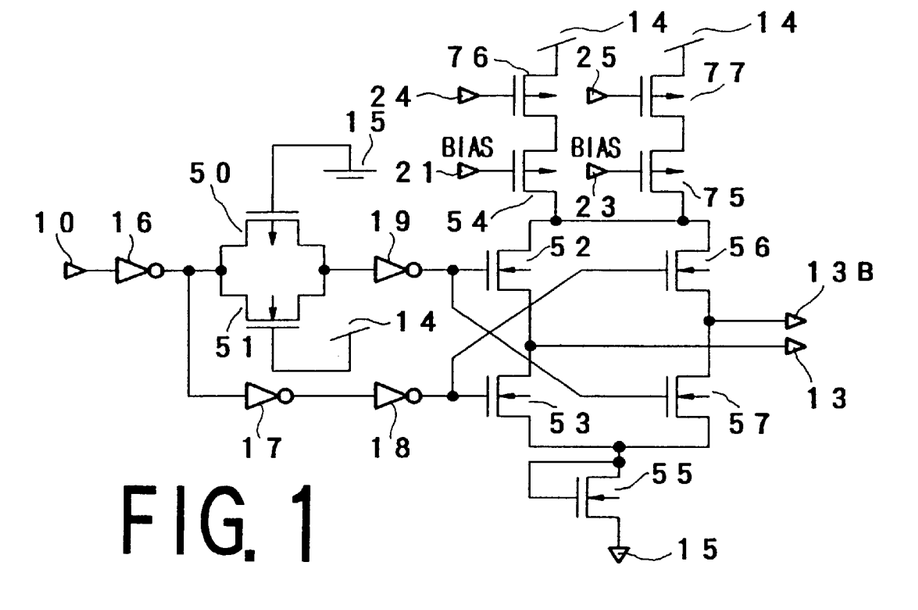
FIG. 1 is a circuit diagram showing a driver circuit of a first embodiment of the driver circuit device according to the present invention.

FIG. 1 shows an embodiment of the driver circuit device according to the present invention, in which the construction of only the driver circuit is shown.

The circuit construction shown in FIG. 1 is basically the same as with the case of the circuit shown in FIG. 6, except that: a transistor 76 having a gate for inputting a control signal through a control signal inputting terminal 24 is connected in series to the transistor 54 having the gate for inputting the bias through the bias input terminal 21; a transistor 75 having a gate for inputting another bias through another bias input terminal 23 is additionally connected in parallel to the transistor 54; and a transistor 77 having a gate for inputting another control signal through another control signal inputting terminal 25 is connected in series to the transistor 75. The circuit construction other than the above is quite the same as with the case of the circuit shown in FIG. 6, so that the same reference numerals have been retained for similar elements or parts having the similar functions, without repeating the similar description thereof.

Figure 2:
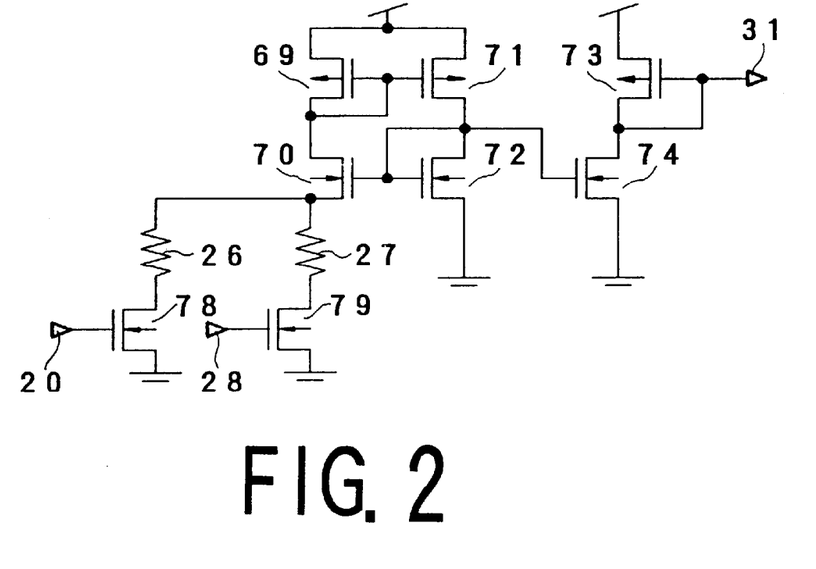
FIG. 2 is a circuit diagram showing a current bias circuit of a second embodiment of the driver circuit device according to the present invention.
Figure 3:
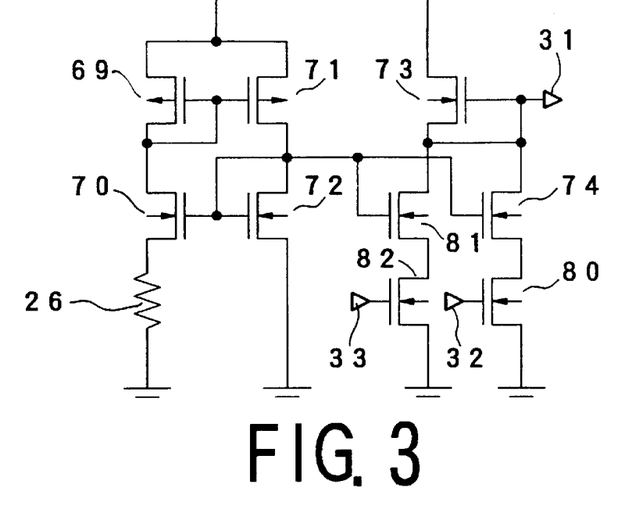
FIG. 3 is a circuit diagram showing a current bias circuit of a third embodiment of the driver circuit device according to the present invention.

In the circuit construction as described above, the current bias is inputted to each of the bias input terminals 21 and 23 from a current bias source as shown in FIG. 8 or FIGS. 2 or 3 (described later), to limit the current value of each of the transistors 54 and 75.

On the other hand, two switch signals controlled on the basis of the detected fluctuations of the signal applied to the input terminal 10 are given to the two control signal input terminals 24 and 25 connected to the gates of the two transistors 76 and 77, respectively. In more detail, when the signal does not fluctuate (as with the case of the idle state), two switch signals are given to the control signal input terminals 24 and 25 to turn on any one of the two transistors 76 and 77. When the signal fluctuates (as with the case of the high speed clock transmission state), on the other hand, the other switch signals are given to the control signal input terminals 24 and 25, respectively to turn on both the two transistors 76 and 77.

In other words, in the idle state where the signal fluctuates slightly, since a large drive current is not required as already explained, the smaller the drive current is, the smaller will be the power consumption. Therefore, in this idle state, any one of the transistors 76 and 77 is turned on through the control signal input terminals 24 and 25. As a result, the signal current flowing through the output terminals 13 and 13B can be reduced down to about 3 mA, for instance, so that it is possible to reduce the power consumption in the idle state.

On the other hand, in the high speed signal transmission state where signals are transmitted at a high speed, in order to obtain a sufficiently large signal amplitude by charging or discharging the parasitic capacitance additionally as described above, a large drive current is required. Therefore, both the transistors 76 and 77 are turned on through the two control signal input terminals 24 and 25. As a result, the signal current flowing through the two output terminals 13 and 13B can be controlled at about 6 mA (twice larger than that in the idle state), so that it is possible to securely transmit the signal at a high speed.

Here, the above-mentioned driver circuit construction can be provided for each input terminal 10 and two output terminals 13 and 13B in one-to-one correspondence relationship. Therefore, when the interface is provided with a plurality of the ports, each port can be controllable by the driver circuit device according to the present invention independently.

Figure 3A:
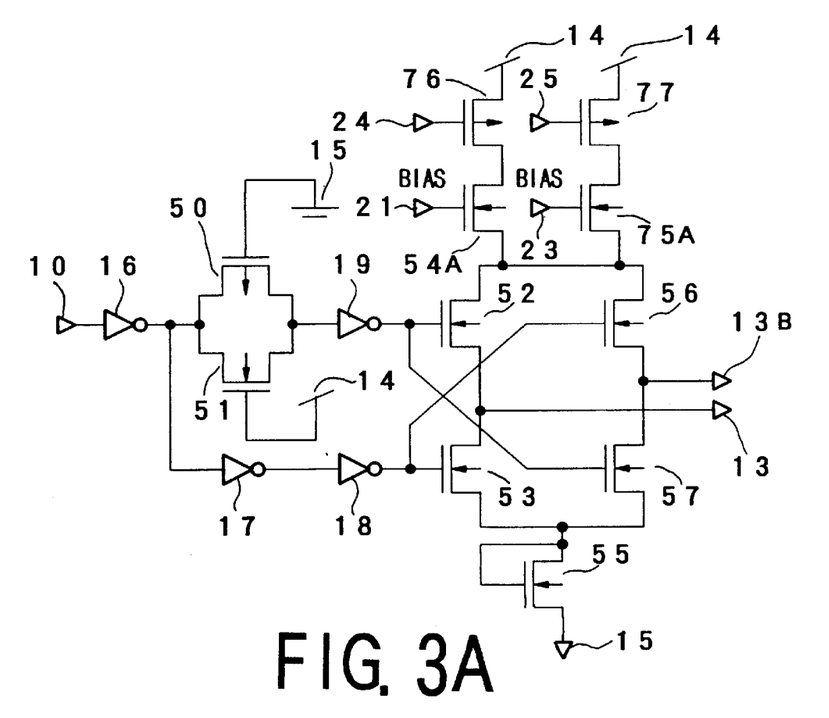
FIG. 3A is a circuit diagram of another embodiment of the driver circuit device according to the present invention.

Further, FIG. 3A shows another embodiment of the driver circuit device according to the present invention.

The driver circuit device shown in FIG. 3A is different from that shown in FIG. 1 in that: N-ch transistors 54A and 75A are provided instead of P-ch transistors 54 and 75. As a result, potential of the transistors 52 and 56 sides increase when the transistors 76 and 77 are in on-state. Therefore, the amplitude of output signals of output terminals 13 and 13B increases.

FIG. 2 shows a second embodiment of the driver circuit device according to the present invention, in which only the current bias circuit is shown.

This current bias circuit is different from that shown in FIG. 8 in that: a transistor 78 having a gate for inputting a control signal through a control signal inputting terminal 20 is connected in series between the resistor 26 and the low voltage supply; a resistor 27 is connected in parallel to the resistor 26; and a transistor 79 having a gate for inputting another control signal through another control signal inputting terminal 28 is connected in series between the resistor 27 and the low voltage supply.

In the circuit construction as described above, the bias of the current bias circuit (source) can be used for the driver circuit device as shown in FIG. 6 or FIG. 1.

On the other hand, two switch signals controlled on the basis of the detected fluctuations of the signal applied to the input terminal 10 shown in FIG. 6 are given to the two control signal input terminals 20 and 28 connected to the gates of the two transistors 78 and 79, respectively. In more detail, when the signal does not fluctuate (as with the case of the idle state), two switch signals are given to the control signal input terminals 20 and 28, respectively to turn on any one of the two transistors 78 and 79. When the signal fluctuates (as with the case of the high speed clock transmission state), on the other hand, the other switch signals are given to the control signal input terminals 20 and 28, respectively to turn on both the two transistors 78 and 79. As a result, the current bias value outputted from the bias output terminal 31 can change the current driving capability of the transistor 54 shown in FIG. 6.

In other words, in the idle state where the signal fluctuates slightly, since a large drive current is not required as already explained, the smaller the drive current is, the smaller will be the power consumption. Therefore, in this case, any one of the transistors 78 and 79 is turned on through the control signal input terminals 20 and 28. As a result, the bias value given from the bias output terminal 31 to the bias input terminal 21 shown in FIG. 6 can limit the current value flowing through the transistor 54. As a result, the signal current flowing through the output terminals 13 and 13B can be limited down to about 3 mA, for instance, so that it is possible to reduce the power consumption in the idle state.

On the other hand, in the high speed signal transmission state where signals are transmitted at a high speed, in order to obtain a sufficiently large signal amplitude by charging and discharging the parasitic capacitance additionally as described above, a large drive current is required. Therefore, in this case, both the transistors 78 and 79 are turned on through the two control signal input terminals 20 and 28. As a result, the bias value given to the bias input terminal 21 shown in FIG. 6 can increase the current value flowing through the transistor 54. As a result, the signal current flowing through the output terminals 13 and 13B of the driver circuit shown in FIG. 6 can be controlled at about 6 mA (twice larger than that in the idle state), so that it is possible to securely transmit the signal at a high speed.

Here, in the above-mentioned driver circuit construction in which the current is controlled by the current bias circuit as described above, when the interface is provided with a plurality of the ports, it is possible to control the currents of all the ports by use of a common current bias circuit.

FIG. 3 shows a third embodiment of the driver circuit device according to the present invention, in which only the current bias circuit is shown.

The circuit construction of this current bias circuit according to the present invention is basically the same as with the case of the current bias circuit shown in FIG. 8, except that: a transistor 80 having a gate for inputting a control signal through a control signal inputting terminal 32 is connected in series between the transistor 74 and the low voltage supply; a transistor 81 is connected in parallel to the transistor 74; and a transistor 82 having a gate for inputting another control signal through another control signal inputting terminal 33 is connected in series between the transistor 81 and the low voltage supply.

Further, in FIG. 3, current the same as that flowing through the transistor 72 flows through both the two transistors 81 and 74, respectively, as far as these transistors 81, 74 and 72 are the same with respect to the current driving capability. However, when the current driving capability is different from each other, the current of each transistor flows at a different rate determined according to each current driving capability thereof. Therefore, when current flows through both the transistors 74 and 81, respectively, a node 31 can obtain a large current driving capability twice larger than that obtained when only the transistor 74 is connected thereto.

In the circuit construction as described above, the bias of the current bias circuit (source) can be used for the driver circuit device as shown in FIG. 6 or FIG. 1.

On the other hand, two switch signals controlled on the basis of the detected fluctuations of the signals applied to the input terminal 10 shown in FIG. 6 are given to the two control signal input terminals 32 and 33 connected to the gates of the two transistors 80 and 82, respectively. In more detail, when the signal does not fluctuate (as with the case of the idle state), two switch signals are given to the control signal input terminals 32 and 33 to turn on any one of the two transistors 80 and 82. When the signal fluctuates (as with the case of the high speed clock transmission state), on the other hand, the other switch signals are given to the control signal input terminals 32 and 33 to turn on both the two transistors 80 and 82. As a result, the current bias value outputted from the bias output terminal 31 can change the current driving capability of the transistor 54 shown in FIG. 6.

In the above-mentioned circuit construction of the present invention, the current driving capability of the NMOS transistor for transmitting the bias current to the gate of the transistor 54 (shown in FIGS. 1 or 6) from the bias output terminal 31 (shown in FIGS. 2 or 3) and through the bias input terminal 21 (shown in FIGS. 1 or 6) is changed by changing the number of the transistors 74 and 81. That is, the current of the transistor 54 can be switched according to the state of the driver circuit.

In the circuit construction as described above, in the idle state where the signal inputted from the input terminal 10 shown in FIG. 6 fluctuates slightly, since a large drive current is not required as already explained, the smaller the drive current is, the smaller will be the power consumption. Therefore, in this case, any one of the transistors 80 and 82 is turned through the control signal input terminals 32 and 33. As a result, the bias value given from the bias output terminal 31 to the bias input terminal 21 shown in FIGS. 6 or 1 can limit the current value flowing through the transistor 54. As a result, the signal current flowing through the output terminals 13 and 13B can be limited down to about 3 mA, for instance, so that it is possible to reduce the power consumption in the idle state.

On the other hand, in the high speed signal transmission state where signals are transmitted at a high speed, in order to obtain a sufficiently large signal amplitude by charging and discharging the parasitic capacitance additionally as described above, a large drive current is required. Therefor, in this case, both the transistors 80 and 82 are turned on through the two control signal input terminals 32 and 33. As a result, the bias value given from the bias output terminal 31 to the bias input terminal 21 shown in FIGS. 6 or 1 can be determined by an addition of both the transistors 74 and 81, so that the current value of the transistor 54 can be controlled so as to be increased. Therefore, the signal current flowing through the output terminals 13 and 13B of the driver circuit shown in FIGS. 6 or 1 can be controlled at about 6 mA (twice larger than that in the idle state), so that it is possible to securely transmit the signal at a high speed.

Here, in the above-mentioned driver circuit construction in which the current is controlled by the current bias circuit as described above, when the interface is provided with a plurality of the ports, it is possible to control the currents of all the ports by use of a common current bias circuit.

Figure 9:
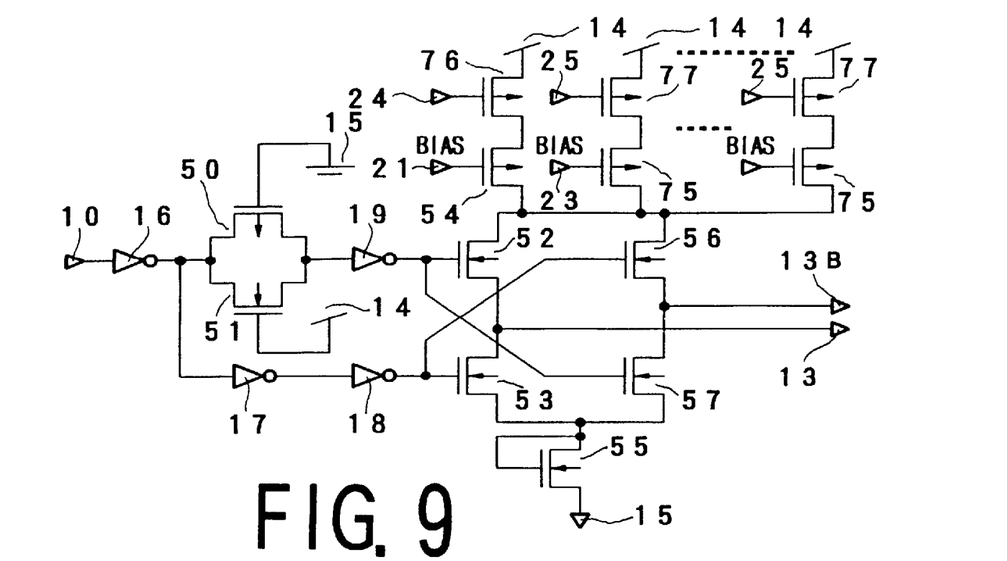
FIG. 9 is a circuit diagram showing a modification of the driver circuit shown in FIG. 1.
Figure 10:
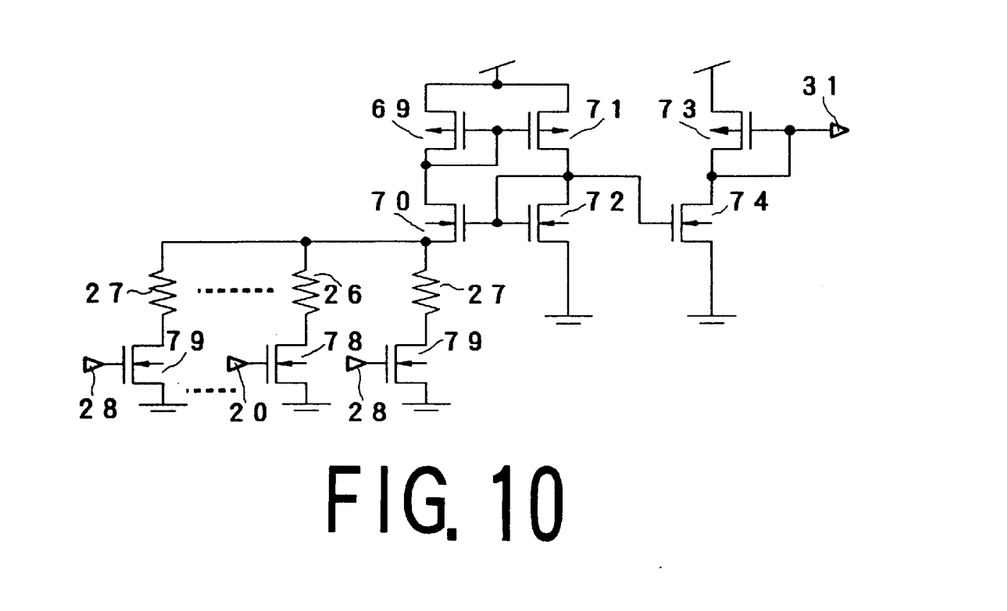
FIG. 10 is a circuit diagram showing a modification of the current bias circuit shown in FIG. 2.
Figure 11:
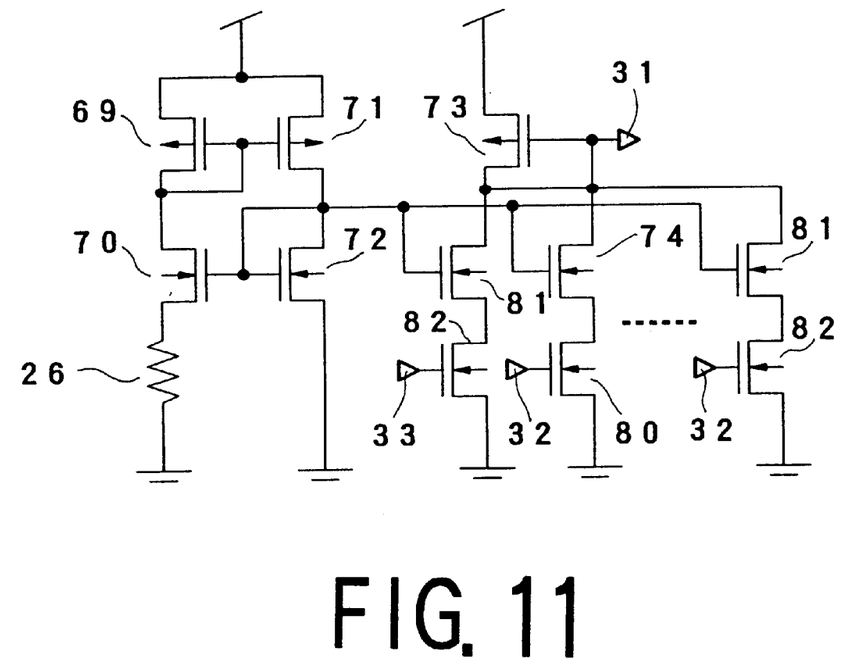
FIG. 11 is a circuit diagram showing a modification of the current bias circuit shown in FIG. 3.

Further, in the circuits shown in FIGS. 1 to 3, although the number of the transistors connected in parallel to each other is two, it is possible to increase this number n, as shown in FIGS. 9 to 11. In more detail, instead of the conventional driver circuit as shown in FIG. 6, it is possible to use the driver circuit as shown in FIGS. 1 or 9. Further, instead of the conventional current bias circuit as shown in FIG. 8, it is possible to use the current bias circuit as shown in FIGS. 2 or 10, and further to connect the current bias circuit to the driver circuit shown in FIGS. 1 or 6. Further, instead of the conventional current bias circuit as shown in FIG. 8, it is possible to use the current bias circuit as shown in FIGS. 3 or 11, and further to connect the current bias circuit to the driver circuit shown in FIGS. 1 or 6.

As described above, in the driver circuit device of constant current drive type used for an LVDS interface according to the present invention, in the signal transmission state, the AC differential signal amplitude can be secured by increasing the current drive capability of the current bias circuit, that is, by increasing the signal current beyond a value enough to generate a differential signal of about 300 mV prescribed by the LVDS standard; and further in the idle state where the clock is not being transmitted, the signal current is limited down to the DC LVDS level. Therefore, it is possible to realize high speed signal transmission higher than 400 MHz by charging and discharging the parasitic capacitance of the package pins, while much increasing the sensitivity of the comparator used as the receiver circuit and while decreasing the current consumption by limiting the current consumption on the drive side according to the necessity.

What is claimed is:

1. A driver circuit device for low voltage differential signals, comprising:

an output circuit for outputting a first output potential from a first output terminal and a second output potential from a second output terminal respectively according to an input signal applied to an input terminal, a differential signal being formed by the first and second output potentials according to the input signal; and a plurality of voltage supply circuits connected between a voltage supply terminal and said output circuit in parallel to each other, each for supplying an operating supply voltage to said output circuit, each of said voltage supply circuits having a switch for connecting or disconnecting the voltage supply terminal to or from said output circuit, the number of said turned-on switches being determined according to a frequency of said input signal, wherein each of said voltage supply circuits further comprises a transistor connected in series with the switch, each having a gate to which a bias voltage is applied.

2. The driver circuit device of claim 1, wherein each of said transistors is a P-channel transistor.

3. The driver circuit device of claim 1, wherein each of said transistors is an N-channel transistor.

4. The driver circuit of claim 2, wherein a current value applied from said voltage supply circuits to said output circuit is changed by changing the number of said turned-on switches.

5. The driver circuit device of claim 3, wherein a voltage value applied from said voltage supply circuits to said output circuit is changed by changing the number of said turned-on switches.

6. The driver circuit device of claim 1, which further comprises a bias circuit for applying the bias voltage to each of said transistors.

7. The driver circuit device of claim 6, wherein said bias circuit operates according to the frequency of the input signal applied to the input terminal so as to change the bias voltage to be outputted.

8. An interface for low voltage differential signals, comprising:

a driver block for outputting a first output potential from a first output terminal and a second output potential from a second output terminal, respectively, according to an input signal applied to an input terminal, so as to form a differential signal between the first and second output potentials;

a transmission circuit, having a going transmission line connected to the first output terminal and returning transmission line connected to the second output terminal, for transmitting signal current according to the differential signal; and a receiver block connected to the going and returning transmission lines for receiving the signal current through the going transmission line, and transmitting an output signal corresponding to the signal current through the returning transmission line, wherein said driver block comprises:

an output circuit for outputting the first output potential from the first output terminal and the second output potential from the second output terminal, respectively according to the input signal applied to the input terminal, the differential signal being formed by the first and second output potentials according to the input signal; and a plurality of voltage supply circuits connected between a voltage supply terminal and said output circuit in parallel to each other, each for supplying an operating supply voltage to said output circuit, each of said voltage supply circuits having a switch for connecting or disconnecting the voltage supply terminal to or from said output circuit, the number of said turned-on switches being determined according to frequency of said input signal, wherein a current value applied from said voltage supply circuits to said output circuit is changed by changing the number of said turned-on switches wherein each of said voltage supply circuits further comprises a transistor connected in series with the switch, each having a gate to which a bias voltage is applied.

9. The interface of claim 8, wherein said going and returning transmission lines form a balanced transmission line for transmitting the signal current through the two transmission lines.

10. The interface of claim 8, wherein said receiver block further comprises an end resistance connected between the going and returning transmission lines for generating a potential difference obtained by passing the signal current through said end resistance, the output signal being outputted by said receiver block on the basis of the generated potential difference.

11. The interface of claim 8, wherein each of said transistors is a P-channel transistor.

12. The interface of claim 8, wherein each of said transistors is an N-channel transistor.

13. A driver circuit device for low voltage differential signals, comprising:

an output circuit for outputting a first output potential from a first output terminal and a second output potential from a second output terminal, respectively, according to an input signal applied to an input terminal, a differential signal being formed by the first and second output potentials according to the input signal, and a plurality of voltage supply circuits connected between a voltage supply terminal and said output circuit in parallel to each other, each for supplying an operating supply voltage to said output circuit, each of said voltage supply circuits having a switch for connecting or disconnecting the voltage supply terminal to or from said output circuit, the number of said turned-on switches being determined according to a frequency of said input signal, wherein a voltage value applied from said voltage supply circuits to said output circuit is changed by changing the number of said turned-on switches, wherein each of said voltage supply circuits further comprises a transistor connected in series with the switch, each having a gate to which a bias voltage is applied.

14. The driver circuit of claim 13, which further comprises a bias circuit for applying the bias voltage to each of said transistors.

15. The driver circuit device of claim 14, wherein said bias circuit operates according to frequency of the input signal applied to the input terminal so as to change the bias voltage to be outputted.

16. The driver circuit device of claim 13, wherein each of said transistors is a P-channel transistor.

17. The driver circuit device of claim 13, wherein each of said transistors is an N-channel transistor.

* * * * *